United States Patent [19]
Sawamura et al.

[11] Patent Number: 5,649,626
[45] Date of Patent: Jul. 22, 1997

[54] FLAT WIRE HARNESS PROTECTOR AND INSTALLATION METHOD THEREOF

[75] Inventors: Naohito Sawamura; Kiyokazu Iio, both of Yokkaichi, Japan

[73] Assignee: Sumitomo Wiring Systems, Ltd., Yokkaichi, Japan

[21] Appl. No.: 592,618

[22] Filed: Jan. 26, 1996

Related U.S. Application Data

[63] Continuation of Ser. No. 208,828, Mar. 11, 1994, abandoned

[30] Foreign Application Priority Data

Mar. 17, 1993 [JP] Japan .................................. 5-011828
Oct. 15, 1993 [JP] Japan .................................. 5-258652
Dec. 20, 1993 [JP] Japan .................................. 5-320312

[51] Int. Cl.⁶ ............................................. B65D 81/05
[52] U.S. Cl. .......................... 206/728; 206/509; 206/724; 206/564
[58] Field of Search .......................... 206/486, 564, 206/722, 728, 509, 724

[56] References Cited

U.S. PATENT DOCUMENTS

| | | |
|---|---|---|
| 1,884,445 | 10/1932 | Wever ............................ 206/728 |
| 2,135,134 | 11/1938 | Ehlers ............................ 206/728 |
| 3,905,510 | 9/1975 | Johnson . |
| 3,983,996 | 10/1976 | Hendren, III ................. 206/564 X |
| 4,101,049 | 7/1978 | Wallace et al. . |
| 4,256,457 | 3/1981 | Behring ....................... 206/564 X |
| 4,440,303 | 4/1984 | Seager . |
| 4,593,816 | 6/1986 | Langenbeck .................. 206/564 X |
| 4,689,103 | 8/1987 | Elarde ......................... 206/564 X |
| 5,050,732 | 9/1991 | Hunsicker, Jr. .............. 206/486 X |
| 5,131,535 | 7/1992 | O'Connor et al. ........... 206/486 X |
| 5,207,325 | 5/1993 | Kennedy ..................... 206/564 X |
| 5,394,983 | 3/1995 | Latulippe et al. ............ 206/564 X |

*Primary Examiner*—Joseph M. Gorski
*Attorney, Agent, or Firm*—Greenblum & Bernstein, P.L.C.

[57] ABSTRACT

A protector for carrying a flat wire harness with a flat wire part and connectors, includes a bottom porion and a rim porion around the bottom portion. The bottom member is provided for positioning and holding the flat wire harness such that the flat wire apart is stretched and the connectors are fit in recesses formed in the bottom portion. The rim portion extends upward and radially outward from the bottom portion for enabling plural protectors to be stacked vertically with a flat wire harness stored in each bottom portion.

4 Claims, 12 Drawing Sheets

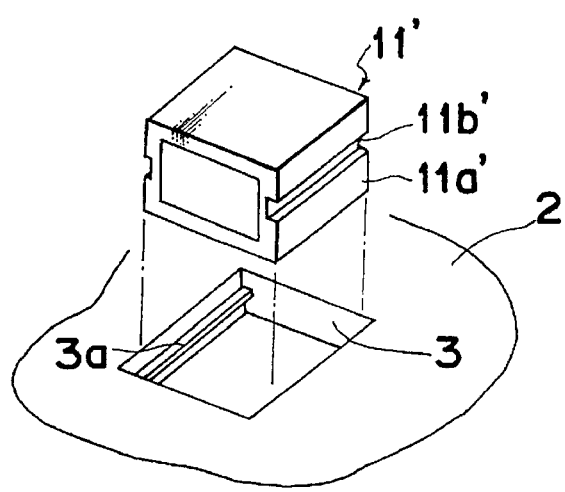
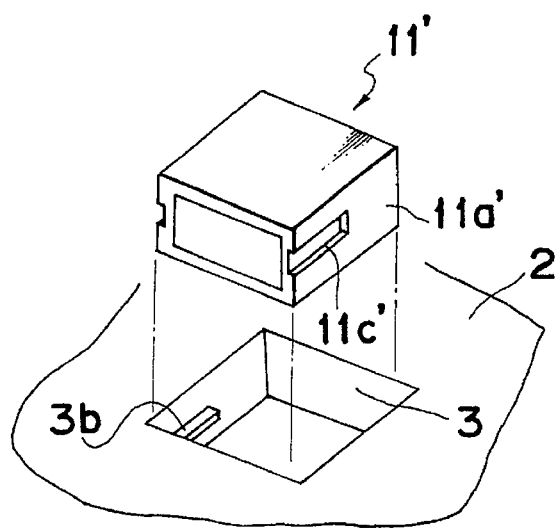
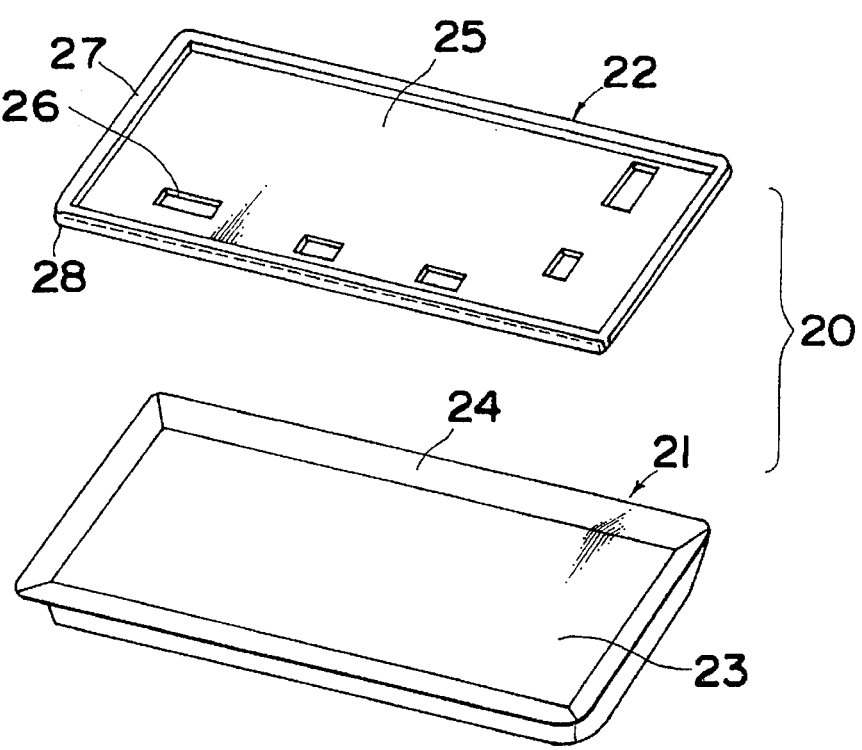

FLAT WIRE HARNESS PROTECTOR AND INSTALLATION METHOD THEREOF

This application is a continuation of application No. 08/208,828, filed Mar. 11, 1994, now abandoned.

BACKGROUND OF THE INVENTION

1. Field of the Invention

The present invention relates to a protector for flat wire harnesses, and particularly to a protector for holding flat wires, the conductors of which are coated on both sides with an insulating film and are terminated with electrical connectors, and also to a method for installing the protectors to a panel member or an installed-to member of a motor vehicle.

2. Description of the Prior Art

Flat wires, including flexible printed circuits (FPC) of stamped copper foil conductors coated on both sides with an insulating resin film and flexible wiring circuits (FWC) of plural small-diameter, parallel conductors coated on both sides with an insulating resin film, are typically manufactured as flat wire harnesses of which the conductor ends are terminated by connectors. These flat wire harnesses are then supplied to automobile manufacturers, office automation equipment manufacturers, and other manufacturers that use the flat wire harnesses in various finished products.

To prevent damage to the flat wire harnesses during packaging, shipping, and storage, it is usually necessary to protect the outside of the harness. Because such flat wire harnesses are by nature not rigid, it is difficult to protect them with colgate tube, vinyl tube, and similar protectors used with conventional wire harnesses.

As a result, a urethane or other shock-absorbing material is used for layering between the flat wire harnesses as the harnesses are packaged in cartons.

This packaging method is inefficient, however, and is complicated by the difficulty of holding the flat wire connectors in a specific location during packaging. It is therefore possible for the connectors to be packaged in contact with the flat wire, and thus accidentally damage the harness.

In addition, because no specific means is used to hold the flat wire harnesses in position, harnesses may be crimped and the conductors damaged, leading to electrical shorts.

SUMMARY OF THE INVENTION

Therefore, an object of the present invention is to provide a protector for easily and positively positioning and holding for storage flat wire harnesses having connectors terminating the flat wires thereof.

To achieve this object, the present invention provides a protector for a flat wire harness, said protector comprising at a predetermined position a tray-shaped fitting member, which enables free placement and removal of the connector terminating the ends of the flat wires, for positioning and holding during storage a flat wire harness with the flat wire part thereof held flat in the bottom of the tray by fitting the harness connector in the fitting member.

This protector is characterized by the fitting member being a recess provided in the bottom part of the tray whereby the connector can be freely placed in and removed from said recess.

Alternatively, a channel or notch may be provided in the connector, and the fitting member of the protector may be a projection from the bottom part of the tray to which the channel or notch in the connector is fit.

In addition, the outside edge of the tray forms a rim spreading upward to the outside of the tray for enabling plural trays to be stacked vertically with a flat wire harness stored in each tray.

Alternatively, a protector for a flat wire harness according to the present invention comprises a tray member, wherein a flat wire harness is placed on the flat bottom thereof, and a cover member, comprising openings at the connector positions for covering the tray member with the connectors placed in the openings of the cover member. This protector is characterized by providing on the cover member and/or tray member engaging members for locking the cover member closed over the tray member.

The protector is manufactured by a vacuum or die molding process.

Note that ejector holes are preferably formed at predetermined positions in the tray bottom for inserting an ejector pin used to smoothly push the flat wire harness from the protector.

When a tray-shaped protector is formed with recesses for the flat wire connectors formed in the bottom thereof and a flat wire harness of which the conductors are terminated with connectors is placed in the bottom of the protector tray, the connectors are held in place by the recesses. As a result, the flat wire harness to which these connectors are connected is also held in place, and can be stored secure to the protector.

It is also possible to store one flat wire harness product in one tray-shaped protector member, place another protector tray over the first protector tray, and store another flat wire harness product in this top tray. It is thus possible to store plural flat wire harness products in a stacked column of protectors for shipping and storage.

When the protector comprises a tray member with a flat bottom and a cover member with holes for the connectors is used, the flat wire harness product is first placed in the tray member and the cover member is then closed to the tray member with the connectors positioned in the corresponding connector holes in the cover member to securely position and hold the flat wire harness product between the tray and cover members.

It is to be noted that stacking this protector comprising tray and cover members is also possible for shipping and storage.

Installation of the flat wire harness product is also made extremely simple by delivering the flat wire harnesses to the assembly in the protector, and using ejector pins inserted to ejector holes in the protector to push the flat wire harness from the protector at the installation position for direct installation to the installed-to member.

BRIEF DESCRIPTION OF THE DRAWINGS

The present invention will become more fully understood from the detailed description given below and the accompanying diagrams wherein:

FIGS. 9a and 9b are partial perspective views of the wire harness connectors and recesses in the protectors for receiving the connectors, FIG. 10 is an exploded perspective view of the protector according to a second embodiment of the invention.

DESCRIPTION OF PREFERRED EMBODIMENTS

Figure 1:
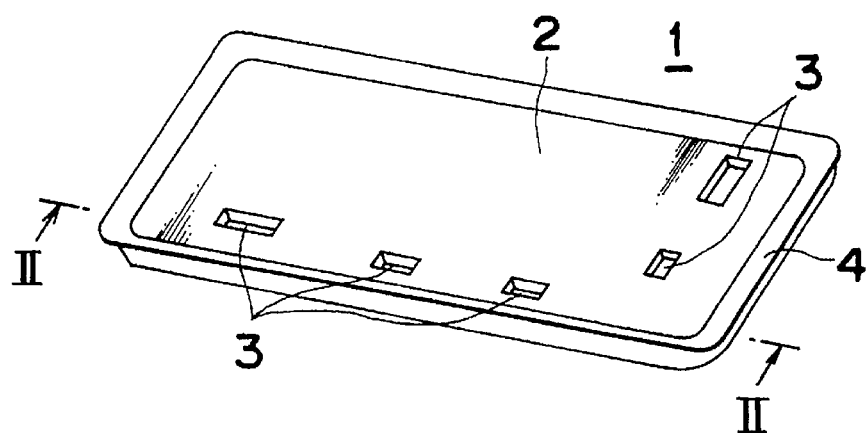
FIG. 1 is a perspective view of a protector according to a first embodiment of the invention.
Figure 2:
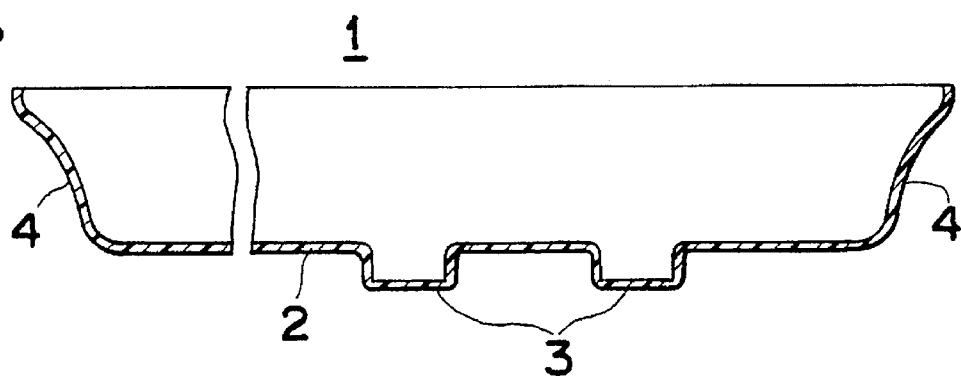
FIG. 2 is a cross-sectional view taken along a line II—II FIG. 1.
Figure 3:
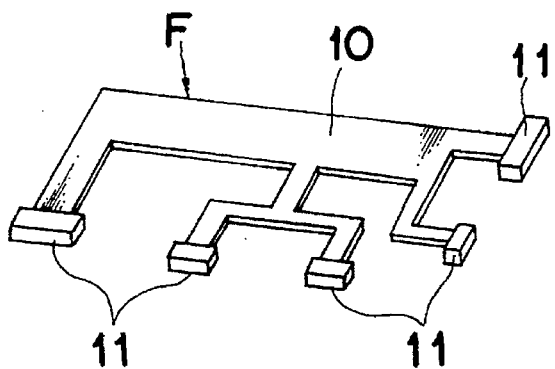
FIG. 3 is a perspective view of a flat wire harness with connectors.

The preferred embodiments of the present invention are described below with reference to the accompanying figures, of which FIGS. 1–5 illustrate the first embodiment of the invention. A casing or a protector 1 for a flat wire harness F is a tray-shaped member made of vacuum-molded resin.

Recesses 3 are molded integrally into the bottom 2 of the tray at predetermined locations for holding the flat wire harness connectors. Rims 4 spreading upward to the outside are provided around the outside edge of the bottom 2.

The resin used to mold the protector 1 is an insulating resin, and is preferably a transparent resin enabling the wire harness stored in the protector 1 to be recognized from the outside.

When a flat wire harness F with plural connectors 11 terminating the ends of the conductors of the flat wire 10 (see FIG. 3) is stored in the protector 1, the flat wire harness F is placed on top of the tray bottom 2 with the connectors 11 fit in the recesses 3.

Figure 4:
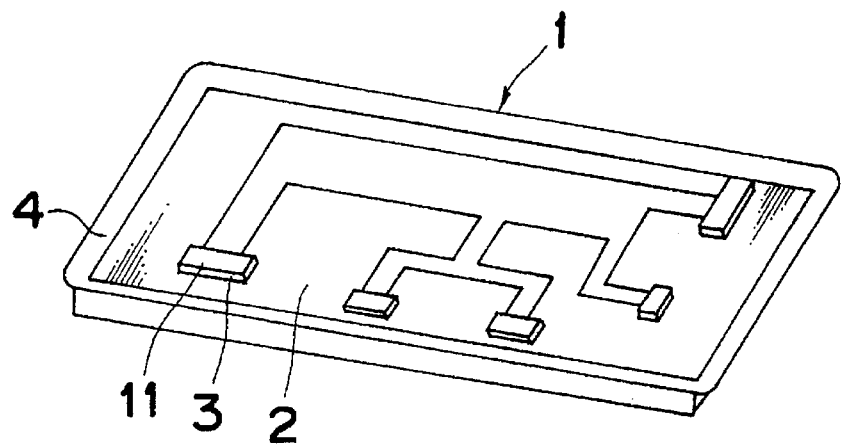
FIG. 4 is a perspective view of a flat wire harness stored in the protector of the first embodiment.

When all of the connectors 11 are fit in the recesses 3 as shown in FIG. 4, the connectors 11 are held correctly positioned and the flat wire 10 connected to the connectors 11 is held positioned in the bottom 2 free of bends, sags, or crimps in the flat wire 10.

In other words, the flat wire 10 and connectors 11 are held securely in the protector 1 in a manner preventing the flat wire 10 or connectors 11 from shifting in position or falling out of the protective material 1 during shipping and storage.

Figure 5:
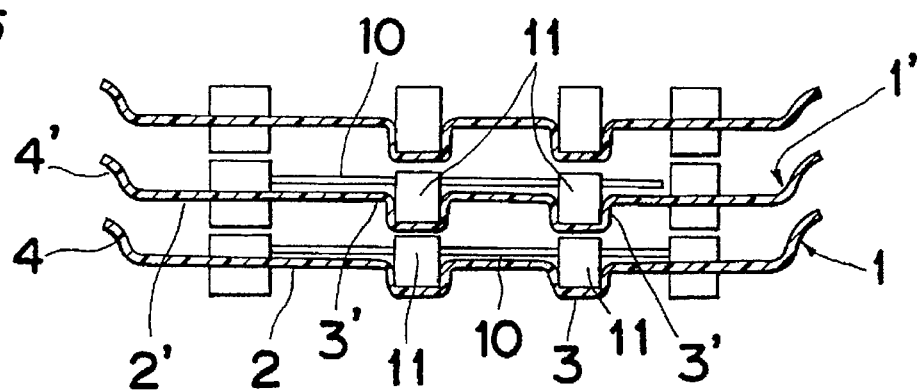
FIG. 5 is a cross-sectional view illustrating how plural protectors of the first embodiment can be vertically stacked.

As shown in FIG. 5, it is also possible to stack one protector 1' in which a flat wire 10 and connectors 11 are held on top of another protector 1 holding a flat wire 10 and connectors 11. Because both protectors 1 and 1' are identically shaped, the bottom surfaces of the recesses 3' in the top protector 1' contact the tops of the connectors 11 stored in the protector 1 below, and the rim 4' on the outside edge of the upper protector 1' stacks inside the rim 4 of the lower protector 1.

As a result, the flat wire 10 is sandwiched between the bottom 2' of the upper protector 1' and the bottom 2 of the protector 1 in which the flat wire 10 is held, and is reliably protected from external forces.

By stacking plural trays together, less space is required and plural protectors 1 holding a flat wire 10 and connectors 11 can be vertically stacked in a single carton for shipping and storage.

Figure 6:
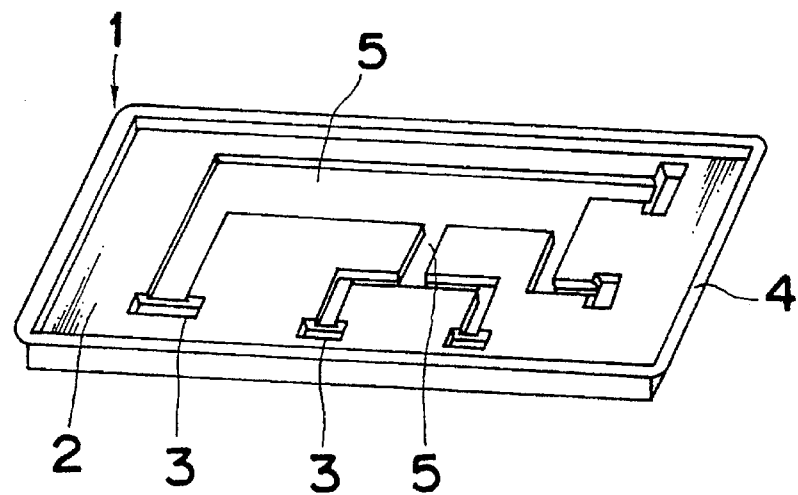
FIG. 6 is a perspective view of a protector according to a first modification of the first embodiment.
Figure 7:
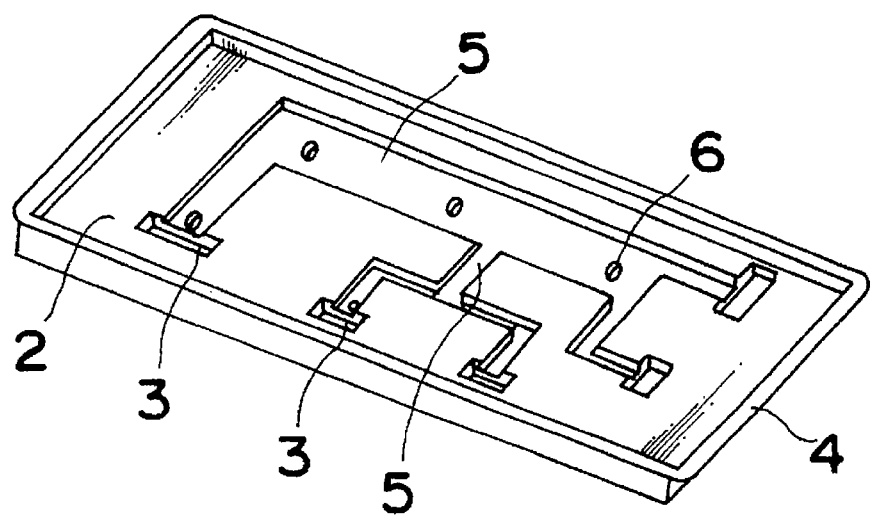
FIG. 7 is a perspective view of a protector according to a second modification of the first embodiment.

A first modification of the first embodiment is shown in FIG. 6. In this modification a shallow recess 5 for holding the flat wire is molded into the bottom 2 of the protector 1 similarly to the recesses 3 for the connectors. Note that the flat wire recess 5 is naturally shallower than the recesses 3 for the connectors.

When this protector 1 is used, the flat wire harness can be held even more securely because the flat wire 10 component is held in the shallow recess 5 and the connectors 11 are held in the connector recesses 3.

A second modification of the first embodiment is shown in FIGS. 7 and 8a–8d. In this embodiment, plural ejector holes 6 are provided at a predetermined interval in the bottom of the flat wire storage recess 5.

In the first embodiment described above and in the first and second modifications thereof, the trays are delivered to the assembly line with the flat wire harness F stored in the protector 1. At the installation position, the flat wire harness F is removed from the protector 1 and pressed against the installed-to member, such as a door panel, to simply affix the flat wire harness F to the installed-to member.

By providing ejector pins 7 in the ejector holes 6 of the second modification, the flat wire harness F can be smoothly ejected from the protector 1, and the flat wire harness F can be held until installation to the installed-to member by the ejector pins 7.

Figure 8A:
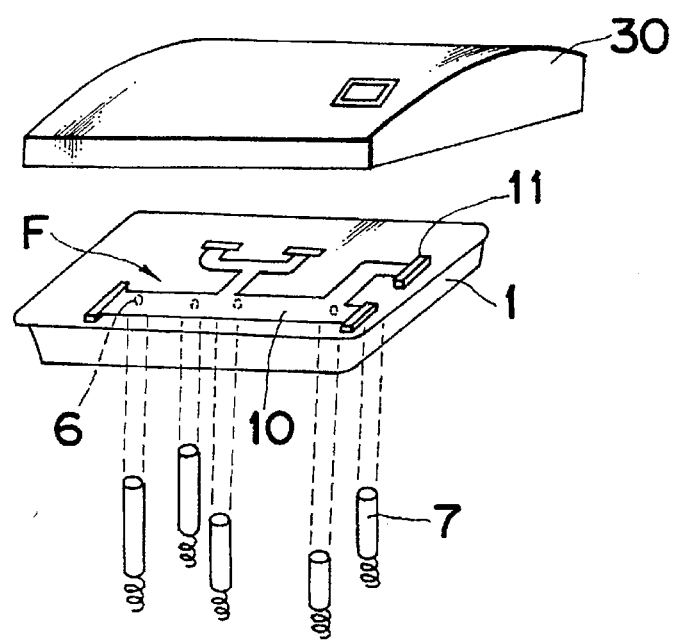
FIGS. 8a to 8d are diagrams showing a series of steps for installing the wire harness from the protector of the present invention to the installed-to member.
Figure 8B:
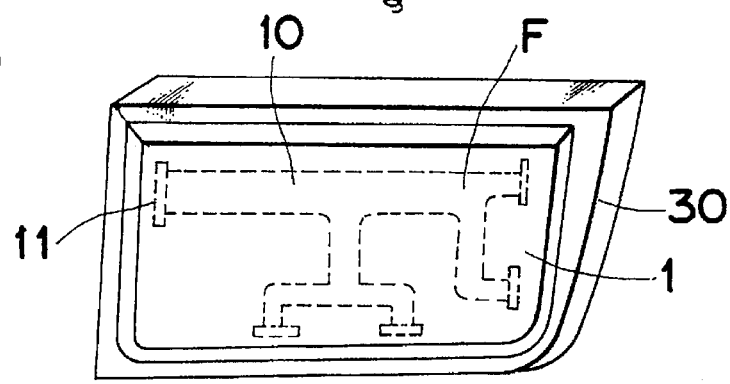
Figure 8C:
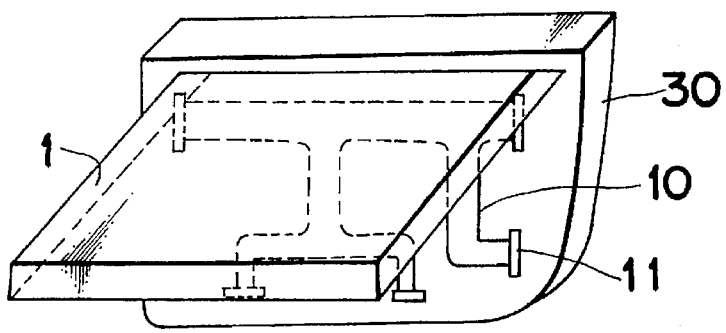
Figure 8D:
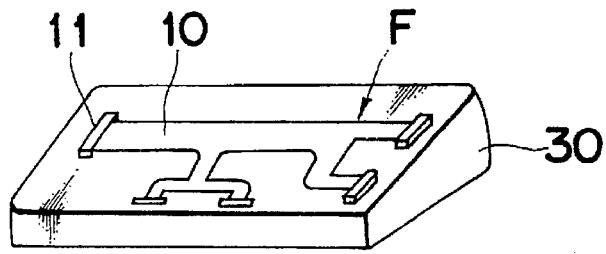

The flat wire harness F comprising a flat wire 10 and connectors 11 as shown in FIG. 8a is used for installation to a motor vehicle door. On the assembly line, the protector 1 holding the flat wire harness F is bonded to the door panel 30 where the flat wire harness F is to be mounted to the door panel 30. The flat wire harness F is then pressed against the door panel 30 using the ejector pins 7, and the connectors 11 are connected to the previously installed vehicle-side connectors (not shown in the figures) to secure the flat wire harness F to the door panel 30. The protector 1 is then removed.

A third modification of a protector according to the present invention is shown in FIGS. 9a and 9b. As shown in FIG. 9a, channels 11b' are provided in the opposite side walls 11a' of the connector 11. Matching projections 3a fitting freely with these channels 11b' are provided in the recess 3 of the protector 1. Similarly, as shown in FIG. 9b, slots 11c' are provided in the opposite side walls 11a' of the connector 11. Matching projections 3b fitting freely with these channels 11c' are provided in the recess 3 of the protector 1.

Figure 11:
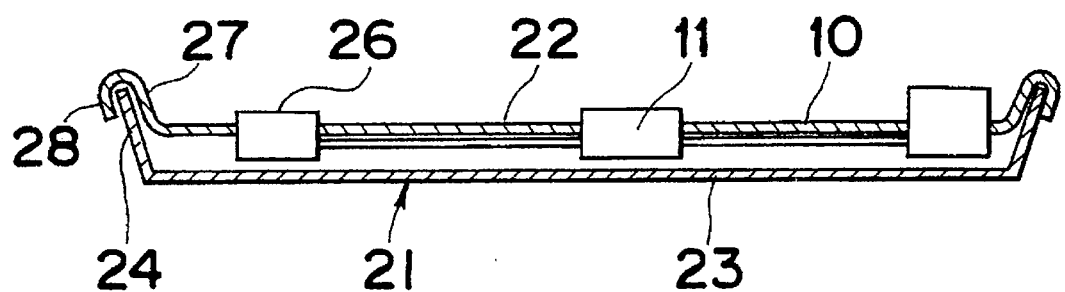
FIG. 11 is a cross-sectional view showing the protector of the second embodiment with the flat wire harness stored therein.

Referring to FIGS. 10 and 11, a second embodiment is shown. In this embodiment, the protector 20 comprises both a tray member 21 and a cover member 22. The bottom 23 of the tray member 21 is flat and the outside edges of the tray member 21 form an outside frame member 24. The cover member 22 is also a tray-shaped member comprising connector holes 26 and an outside frame member 27. The outside of the outside frame member 27 contacts the inside of the outside frame member 24 of the tray member 21 with the rolled edge 28 of the outside frame member 27 engaging the top edge of the outside frame member 24.

Both the tray member 21 and cover member 22 are vacuum molded from an insulating resin.

With the protector 20 of this second embodiment, the flat wire 10 and terminating connectors 11 are first placed on the bottom 23 of the tray member 21. The tray member 21 is then covered with the cover member 22, and the connectors 11 are passed through the connector holes 26. The connectors 11 are positioned and held by then engaging the rolled edge 28 of the cover member 22 over the top edge of the outside frame member 24 of the tray member 21. As a result, the flat wire 10 connected to the connectors 11 is positioned and held sandwiched between the tray member 21 and cover member 22.

These protectors 20 can be stacked for packaging, shipping, and storage with the flat wire harnesses F stored inside the protector 20, in a manner similar to that shown in FIG. 5.

It is to be noted that the tray member 21 and cover member 22 can be integrally molded with the two members joined by a thin hinge. This configuration offers the added benefit of simplified parts inventory because the tray members 21 and cover members 22 are provided as a single component rather than separate parts.

As will be obvious from the above descriptions of the invention, the flat wire connectors can be secured in the protector, and the flat wire connected to the connectors can be positioned and held securely in the protector, by fitting the connectors in recesses formed in the protector or holes formed in the cover member of the protector according to the invention.

As a result, the conductor is not damaged inside the protector because the flat wire harness is held flat in the bottom of the protector and cannot bend or sag.

As also noted above, plural protectors each holding a single flat wire harness can be stacked vertically. As a result, each flat wire harness is sandwiched between the protector above and below, reliably preventing application of external forces to the flat wire harnesses, requiring less storage and packaging space, and facilitating storage and shipment of many flat wire harnesses.

Automation of flat wire harness installation to the installed-to member is also possible by delivering the flat wire harnesses in the protector to the assembly line where each flat wire harness is removed from the protector positioned to the installed-to member using a special extraction tool.

Other benefits of the invention include efficient packaging because the flat wire harness is simply placed in the protector, and extremely low-cost manufacture of the protector by means of vacuum or die molding of a resin material.

Figure 12:
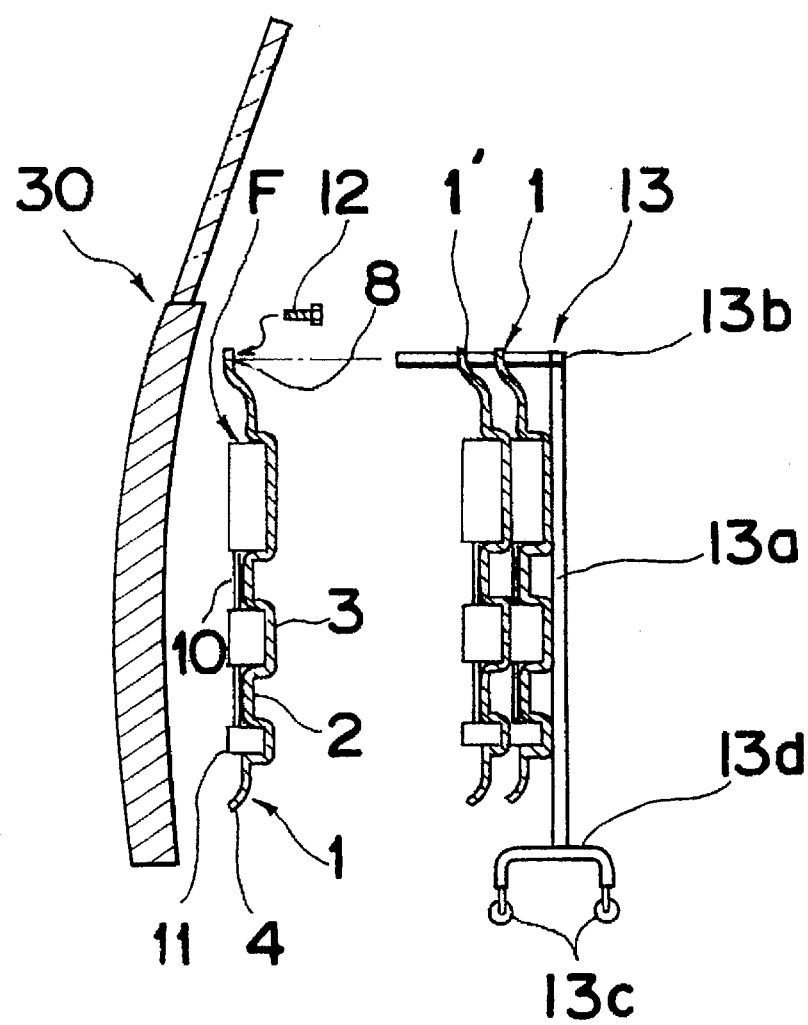
FIG. 12 is a diagram showing the protector of a third embodiment with an installation hanger.
Figure 13A:
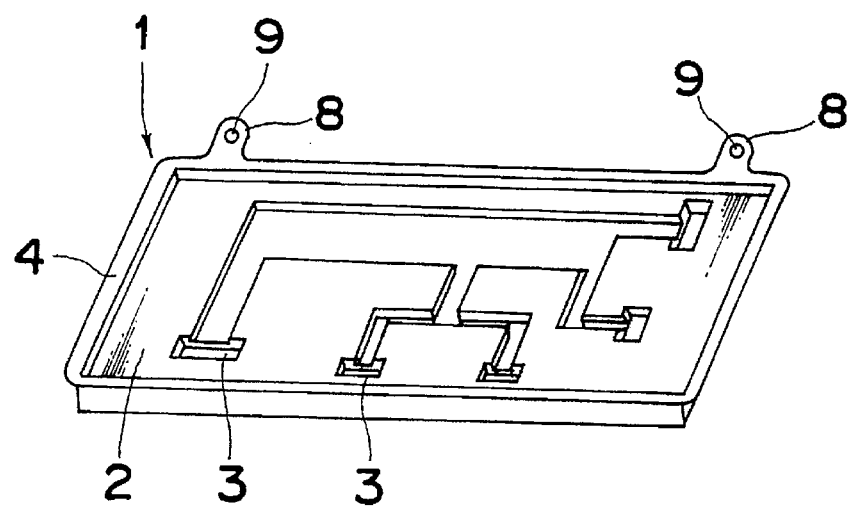
FIGS. 13a and 13b are perspective views of a protector without and with the flat wire harness, respectively, according to the third embodiment.
Figure 13B:
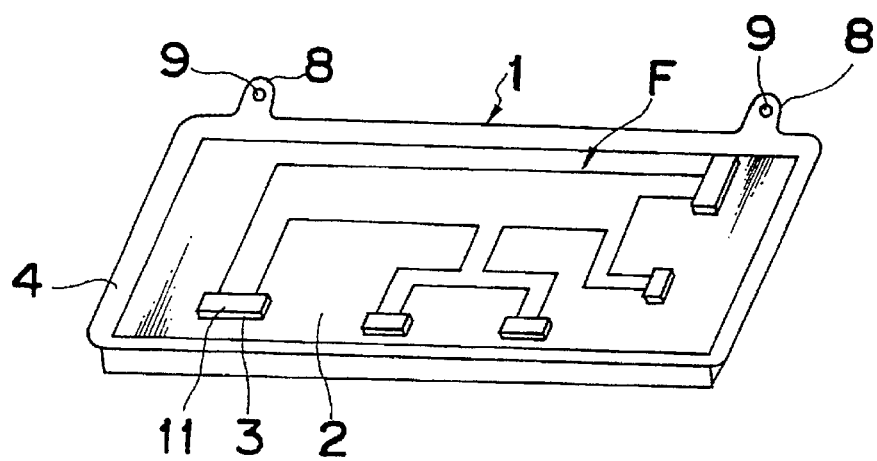

Referring to FIGS. 12, 13a and 13b, a protector 1 according to a third embodiment of the present invention is shown. The protector 1 is a tray-shaped member made of vacuum- or die-molded transparent insulation plastic.

As shown in FIGS. 13a and 13b, the protector 1 is a tray-shaped member comprising recesses 3 at specified locations in the bottom 2 of the protector 1. These recesses 3 are used to hold and position the connectors 11 terminating the ends of the flat wire harness F.

A rim 4 having a wide exterior face and extending to the outside is provided around the perimeter edge of the bottom 2. Plural, such as two, tongue portions 8 projecting to the outside from the perimeter edge are provided on one side of and flat with the rim 4. A through hole 9 is provided at approximately the center of each tongue portion 10d. A bolt 12 or similar fastener is threaded through each hole 9 to fasten the protector 1 to the vehicle door panel or other installed-to member 30 (shown in FIG. 12).

By fitting the connectors 11 on the ends of the flat wire harness F into the recesses 3 of the protector 1, the protector 1 can securely hold the flat wire harness F stretched and properly positioned in the bottom 2. Thus stored in the protector 1, the flat wire harness F is protected from contact with external objects, and can be reliably protected from damage.

The protectors 10 can also be hung on the hanger 13 or other carrier in a horizontal stack of plural protectors 1 and 1', each housing a flat wire harness F inside, as shown in FIG. 12. As a result, plural flat wire harnesses F can be efficiently packaged and shipped with minimal space requirements.

Figure 14:
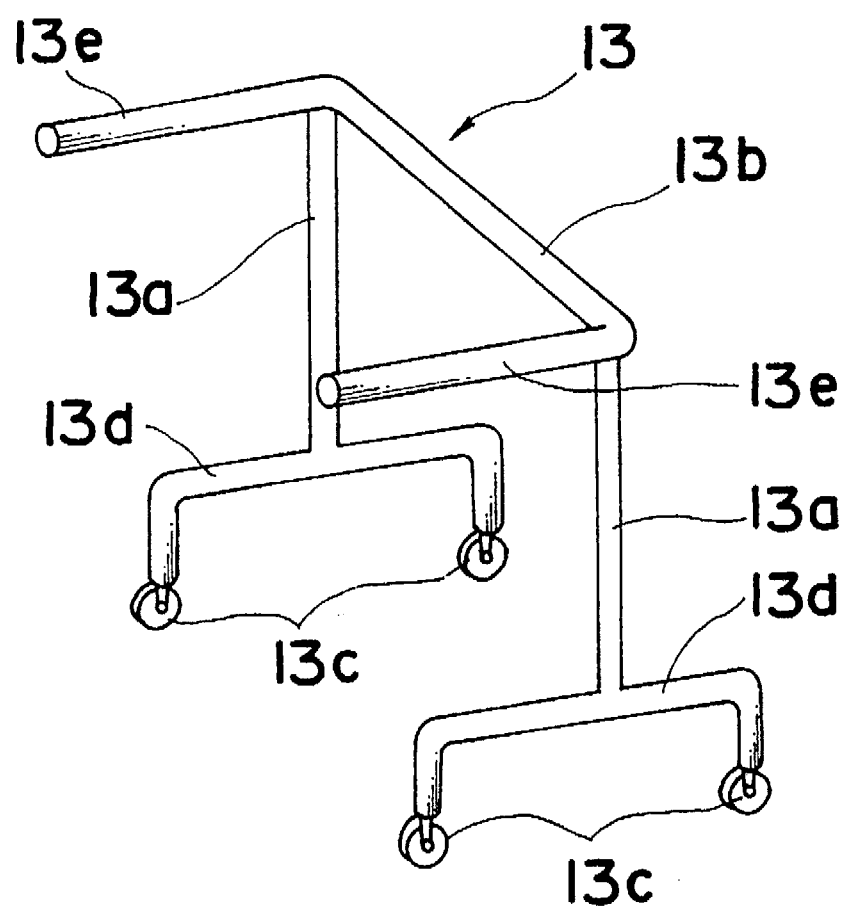
FIG. 14 is a perspective view of a installation hanger used to store and transport the protector of the third embodiment.

Referring to FIG. 14, a hanger 13 is used for the carrier of the protector 1. As shown in FIG. 12, the protectors 1 are suspended vertically from the hanger 13, and can be stored, managed, and delivered to the assembly line in this position.

More specifically, the hanger 13 comprises a pair of vertical side supports 13a joined by a horizontal cross member 13b and each supported by a leg member 13d comprising movable rollers 13c at the bottom ends thereof. At each end of the cross member 13b is a holding frame 13e projecting forward. Note that these holding frames 13e are shaped to pass through the holes 9 in the protectors 10.

When a protector 1 housing a flat wire harness F is loaded onto the hanger 13, the tongue portions 8 are positioned at the top of the protector 1, the holding frames 13e of the hanger 13 are passed through the hole 9 in each tongue portion 8, and the protector 1 is thus suspended on the holding frame 13e. A specified plural number of protectors can be similarly hung on the hanger 13, which can be moved to carry the protectors 1 to the installed-to member 30.

At the installation position, the protectors 1 are removed from the hanger 13 by removing the tongue portions 8 of the protectors 1 from the holding frame 13e of the hanger 13. With the flat wire harness F housed in the protector 1, the protector 1 is placed at the specified position of the installed-to member 30 and is secured to the installed-to member 30 by threading a bolt 12 through the holes 9 in the protector 1 into a nut (not shown in the figures) previously fixed to the installed-to member 30.

It is thus possible to easily hold plural protectors 1 in a removable manner on the hanger 13 used as the carrier. The protector 1 can also be easily secured to the installed-to member 30 by removing the tongue portions 8 of each protector 1 from the holding frames 13e of the hanger 13, and tightening a bolt 12 through the tongue portions 8.

As will be known from the above description of the third embodiment, a protector provides tongue portions on the perimeter edge of the protector holding the flat wire harness, and can be fastened to the installed-to member with a bolt passed through the tongue portions with the flat wire harness still held in the protector. It is therefore not necessary to remove the flat wire harness from the protector for installation to the installed-to member, and damage caused by contact between the flat wire harness and external members can be reliably prevented.

Unlike conventional protectors from which the flat wire harness must be removed for installation, thus making installation more difficult by allowing the flat wire harness to sag and requiring long harnesses to be secured in plural places, flat wire harnesses can be installed using the present invention by simply fastening the tongue portions of the protector to the installed-to member, and productivity is thus improved.

The protector can also be easily attached to the holding frame of the shipping hanger by passing the holding frame through the tongue portions used to install the protector to the installed-to member. It is therefore possible to hold plural protectors on a single shipping hanger, and the protectors can be shipped, stored, and delivered to the assembly line in this condition. Managing and working with the protectors is thus simplified, and job productivity is improved.

Referring to FIGS. 15a–19, a protector 40 for flat wire harnesses according to a fourth embodiment of the present invention is shown. The protector 40 is a tray-shaped member made of vacuum- or die-molded transparent insulation plastic.

A bottom pile cloth 41 with a dense pile of filament-like female engaging members 41a is laid throughout the rectangular bottom 40a of the protector 40, and is bonded in place with adhesive.

Plural (two in this embodiment) top pile cloths 42 are provided at a predetermined spacing along the length of the flat wire harness F placed in the protector 40. One end 42b of the top pile cloth 42 is fastened by a screw or a similar fastener 43 near one edge of the bottom pile cloth 41. The fastener 43 is secured in the bottom 40a in a manner allowing the top pile cloth 42 to be turned around the fastener 43 to any angle.

The bottom of the top pile cloth 42 facing the female engaging members 41a of the bottom pile cloth 41 is a dense pile of filament-like male engaging members 42a for engaging said female engaging members 41a. A mark 44 enabling the user to easily identify where to hold is provided at the free end 42c of the top pile cloth 42 opposite the fastener 43.

Figure 15A:
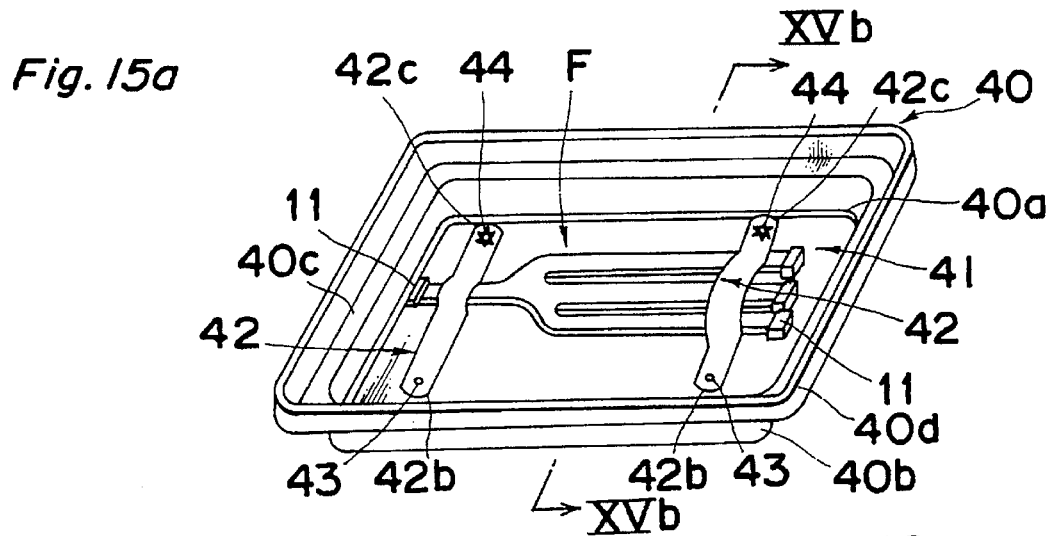
FIG. 15a is a perspective view of the protector according to the fourth embodiment of the present invention.
Figure 15B:
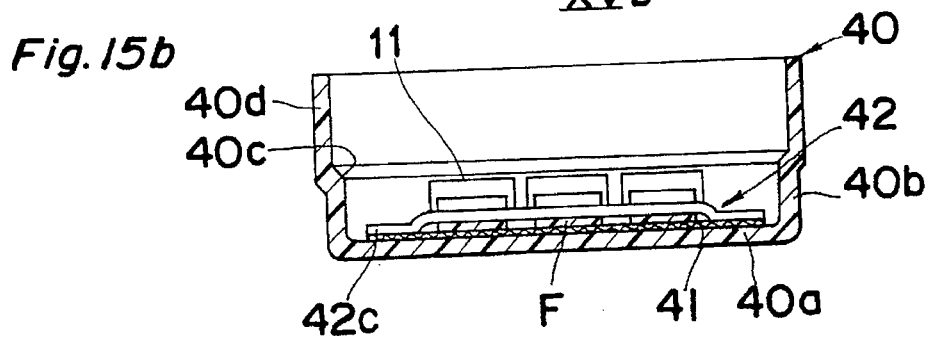
FIG. 15b is a cross-sectional view taken along line XVb—XVb in FIG. 15a, FIG. 16 is a view similar to FIG. 15b, but showing a detailed cross-section.

As shown in FIG. 15b, a shoulder 40c is provided in the outside wall 40b extending up from the bottom 40a of the protector. The shoulder 40c is formed by molding an L-shaped ledge projecting to the outside of the protector 40 in the outside wall 40b at a height above the height of the connectors 11 for the flat wire harness F stored in the protector 40. The top of this L-shaped ledge forms the top side wall 40d. When plural protectors are nested together (see FIG. 18), the outside wall 40b of the top protector 40B fits inside the top side wall 40d of the bottom protector 40 with the bottom 40a of the top protector 40B resting on the shoulder 40c of the bottom protector 40.

Figure 16:
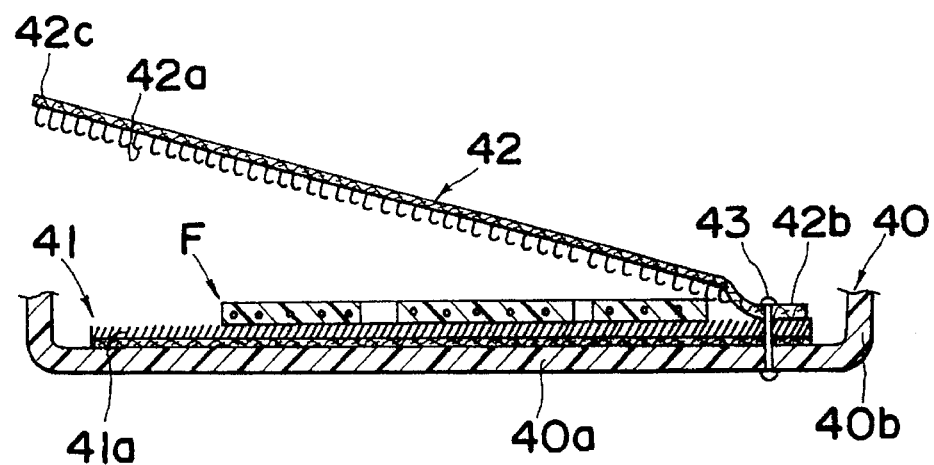

When a flat wire harness is stored in the protector 40 described above, the free end 42c of the top pile cloth 42 is raised as shown in FIG. 16, allowing the flat wire harness F to be placed on the bottom pile cloth 41 between the bottom pile cloth 41 and the top pile cloth 42.

Depending on the shape of the flat wire harness F placed on the bottom pile cloth 41, the top pile cloth 42 is turned on the fastener 43 to adjust the orientation, and the free end 42c is then lowered to the bottom pile cloth 41. This causes the male 42a and female engaging members 41a to engage, thus holding the flat wire harness F securely in the protector 40.

Figure 17:
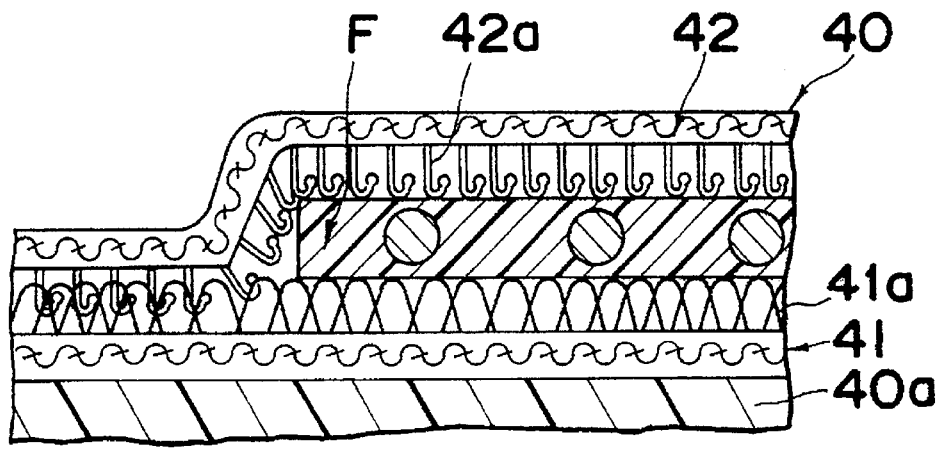
FIG. 17 is a view similar to FIG. 15b, but showing a further detailed cross-section.
Figure 18:
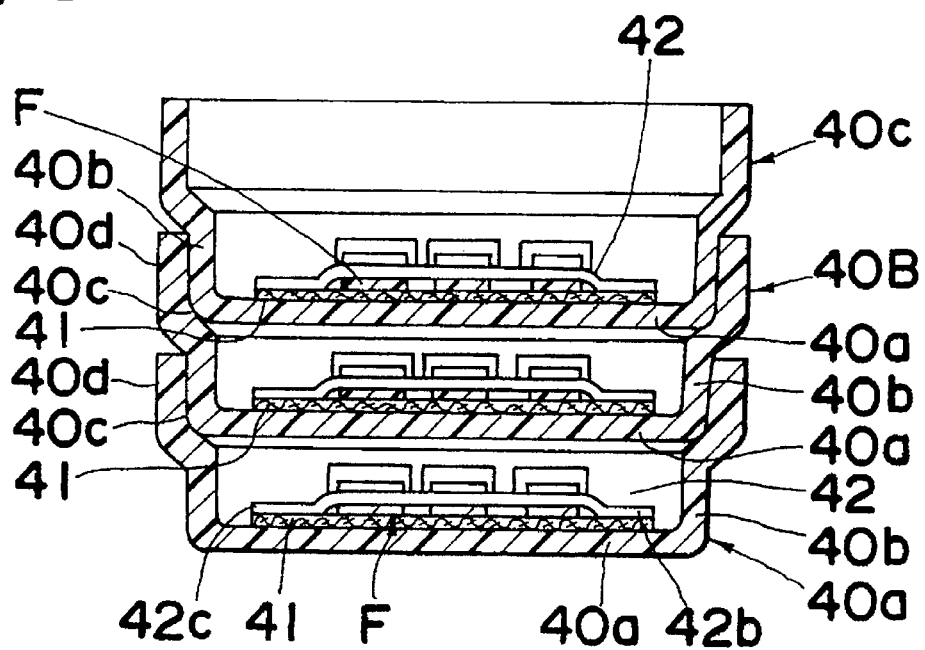
FIG. 18 is a cross-sectional view showing the protectors of the fourth embodiment when stacked.

When the male and female engaging members are engaged as shown in FIG. 17, the flat wire harness F is held firmly immobile between the top and bottom pile cloths 42 and 41.

Using the protector 40 thus described, a flat wire harness F of any configuration can be held positively in the protector 40.

When plural protectors 40A, 40B, 40C, each holding a flat wire harness F as described above, are stacked together as shown in FIG. 18, each protector 40 nests into the protector 40 below, and the nested stack can be compactly stored in a plastic box (not shown in the figures) for shipping to automobile manufacturers, office equipment manufacturers, and other users.

Because the shoulder 40c on which the bottom of the nested protector 40 rests is provided at a height above the connectors 11 of the flat wire harness F stored in the protector 40, the load of the flat wire harnesses F and protectors 40 stacked above does not bear on the flat wire harnesses F or connectors 11, and damage thereto is thus prevented.

Figure 19:
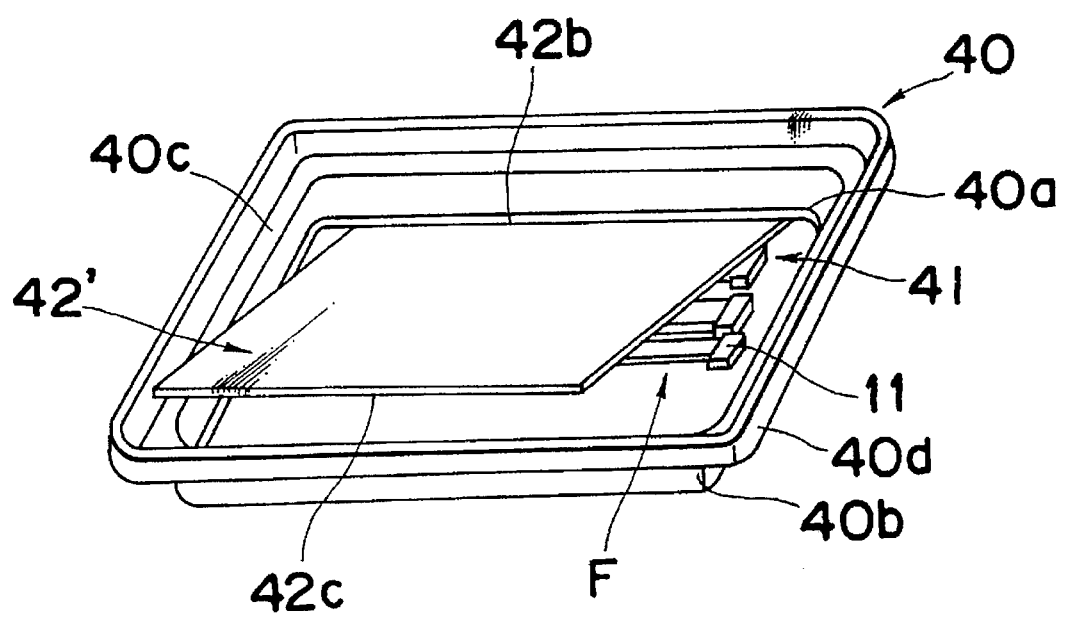
FIG. 19 is a perspective view showing a modification of the fourth embodiment.

It is to be noted that the flat wire harness protector according to the present invention shall not be limited to the above embodiment, and may, for example, specifically provide the top pile cloth 42' as a single sheet as shown in FIG. 19.

A protector according to the fourth embodiment of the present invention can securely hold flat wire harnesses of different configurations because the flat wire harness protector of the invention provides a bottom pile cloth with female engaging members on the bottom of the protector, provides a top pile cloth with male engaging members engaging said female engaging members, and holds the flat wire harness placed between the top and bottom pile cloths by engagement of the male and female engaging members.

In addition, accidental loss of the top pile cloth is prevented and storage and handling of the protectors is thus made easier by securing the top pile cloth by means of a screw or other fastener at one side of the bottom pile cloth.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A protector in combination with a wire harness having a flat wire part and at least one connector connected thereto, said protector comprising:

a bottom member comprising a relatively shallow recess receiving the flat wire part and at least one relatively deep recess receiving the at least one connector, said bottom member positioning and holding the wire harness such that the flat wire part is stretched while the at least one connector is in said at least one relatively deep recess; and a rim member integrally provided around said bottom, said rim member extending upward and radially outward of said bottom member for enabling plural protectors to be stacked vertically with a wire harness stored in each bottom member;

wherein each of said at least one relatively deep recess comprises a bottom surface adapted to contact a top surface of a connector of an additional wire harness arranged in another of said protectors to render said protectors stackable while maintaining said flat wire part free from bends, sags or crimps and maintaining said connector in a stable position.

2. The protector according to claim 1, further comprising:

at least one through hole in said relatively shallow recess for pushing said flat wire harness to help removal of the flat wire harness from the bottom member.

3. The protector according to claim 2, wherein said at least one through hole comprises plural holes provided at a predetermined interval in said relatively shallow recess.

4. The protector according to claim 1, wherein the protector is manufactured by a molding process.

* * * * *